Patented Feb. 19, 1929.

1,702,850

UNITED STATES PATENT OFFICE.

LEOPOLD RUZICKA, OF GENEVA, SWITZERLAND, ASSIGNOR TO M. NAEF & CO., OF GENEVA, SWITZERLAND, A COMPANY OF SWITZERLAND.

PROCESS FOR THE PREPARATION OF MONOCYCLIC KETONES AND THEIR ALKYL DERIVATIVES HAVING MORE THAN NINE RING MEMBERS.

No Drawing. Application filed November 19, 1926, Serial No. 149,542, and in Switzerland December 15, 1925.

In the prior application, Serial No. 36,049, filed June 9, 1925, now Patent No. 1,673,093, there is described a process for the formation of monocyclic ketones having more than nine ring members, according to which normal dicarboxylic acids having more than ten carbon atoms in a normal chain are subjected to the usual methods for preparting ketones. It has been found advantageous to use thorium for these methods.

It has since been discovered that according to these methods the alkyl derivatives of the above mentioned ketones can be obtained. This discovery forms the subject of the present invention.

According to the present invention alkyl derivatives of monocyclic ketones having more than nine ring members are prepared by starting from the alkyl derivatives of the dicarboxylic acids having more than ten carbon atoms in a normal chain. The use of metals or compounds of metals belonging to the fourth group of the periodic system for instance thorium has also been found advantageous.

It is also advantageous to use a mixture of these metals or of a mixture of two or more metals of the third and fourth groups of the periodic system or of the rare earths, these mixtures being obtained artificially or otherwise.

Mixtures of the above mentioned dicarboxylic acids or their alkyl derivatives, which are prepared from the pure acids, or their alkyl derivatives or such as they are obtained in certain technical processes or from natural products, give according to the present invention mixtures of the ketones or their alkyl derivatives which, in this form, can also be employed in practice.

For obtaining the mentioned monocyclic ketones it is also possible to heat directly the acids or the acid anhydrides alone or in presence of metals or metal compounds to a comparatively high temperature, instead of first transforming the corresponding dicarboxylic acids into salts. In this case the use of metals of the fourth group of the periodic system is also advantageous.

The ketones and their alkyl derivatives obtained by the described process can be used as perfumes or as primary materials for the preparation of other technically important compounds.

Example 1.

The thorium salt of 3-methyl-tetradecane-1.14-dicarboxylic acid is heated, preferably in a vacuum, up to 300 to 500 degrees centigrade and the distillate obtained therefrom is worked up by fractional distillation. The fractions distilling at from 100 to 150° C. at a pressure of 0.5 mm. are then treated with semicarbazide or other reagent usually employed for isolating the ketones.

The formation of the 3-methyl-cyclopentadecanone can be represented by the following equation:

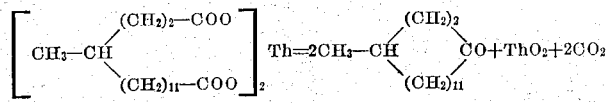

The pure 3-methyl-cyclopentadecanone can also be isolated by treating with acids the semicarbazone purified by crystallization in alcohol and melting at about 164° C.

The 3-methyl-cyclopentadecanone boils at 125° C. (at 0.3 mm.) and has a smell corresponding practically wholly to that of natural musk and can therefore be used as a perfume as well as a primary material for preparing other interesting technical compounds.

Example 2.

3-methyl-tetradecane-1.14-dicarboxylic acid is heated up to above 300 to 500 degrees centigrade and towards the end of the reaction preferably in a vacuum with thorium hydroxide in a quantity which does not suffice for completely converting the acid into the normal salt. The product obtained is treated according to the method described in Example 1.

Example 3.

A mixture of thorium and cerium salts of 4-methyl-tetradecane-1.14-dicarboxylic acid is heated and worked up as described in Example 1. The 4-methyl-cyclopentadecanone obtained boils at about 125° C. (at 0.3 mm.), gives a semicarbazone melting at about 166° C. and has a smell practically corresponding to that of natural musk and can therefore be used as perfume and for preparing other interesting technical compounds.

*Example 4.*

4-methyl-tetradecane-1.14-dicarboxylic acid is heated at about 300 to 500° C. and towards the end of the reaction preferably in a vacuum with thorium oxide. The product obtained is worked up as described in Example 3.

*Example 5.*

A thorium salt of tetradecane-1.14-dicarboxylic acid is prepared by partially neutralizing this acid with sodium hydroxide and precipitating with thorium chloride. The resulting thorium salt is decomposed by heating and worked up as described in Example 1.

*Example 6.*

The thorium salt of octadecane-1.18-dicarboxylic acid is heated preferably in a vacuum to about 300 to 500° C. and the resulting distillate is worked up by fractional distillation. The fraction distilling at from 140 to 180° C. (at 0.3 mm.) is then treated with semicarbazide or another reagent usually employed for isolating the ketones. The cyclononadecanone in a pure state can in this manner be isolated by treating the semicarbazone purified by crystallization from alcohol and melting at 184° C. This ketone boils at 160° C. (at 0.3 mm.), melts at 72° C. and has a smell which nearly corresponds to that of civetone. It can therefore be used as a perfume and as a primary material for preparing other interesting technical compounds; by oxidizing the cyclononadecanone with chromic acid heptadecane-1.17-dicarboxylic acid is formed.

I claim:

1. A process for the preparation of alkyl derivatives of monocyclic ketones having more than nine ring members comprising heating thorium salts of alkyl derivatives of polymethylene dicarboxylic acids, having more than ten carbon atoms in a normal chain, the carboxylic acid groups being linked to the end carbons thereof.

2. A process for the preparation of alkyl derivatives of monocyclic ketones having more than nine ring members comprising heating a mixture of thorium salts and cerium salts of alkyl derivatives of polymethylene dicarboxylic acids having more than ten carbon atoms in a normal chain, the carboxylic acid groups being linked to the end carbons thereof.

In testimony whereof I affix my signature.

LEOPOLD RUZICKA.